(12) United States Patent
Coates

(10) Patent No.: US 9,534,560 B2
(45) Date of Patent: Jan. 3, 2017

(54) HEAT ENGINE

(75) Inventor: Nicholas Richard Coates, East Sussex (GB)

(73) Assignee: 2020 POWER GENERATION LIMITED (GB)

(*) Notice: Subject to any disclaimer, the term of this patent is extended or adjusted under 35 U.S.C. 154(b) by 839 days.

(21) Appl. No.: 13/503,594

(22) PCT Filed: Oct. 25, 2010
(Under 37 CFR 1.47)

(86) PCT No.: PCT/GB2010/001977
§ 371 (c)(1),
(2), (4) Date: Jun. 6, 2013

(87) PCT Pub. No.: WO2011/048392
PCT Pub. Date: Apr. 28, 2011

(65) Prior Publication Data
US 2013/0318938 A1 Dec. 5, 2013

(30) Foreign Application Priority Data
Oct. 23, 2009 (GB) .................................. 0918707.1

(51) Int. Cl.
*F02G 1/02* (2006.01)
*F01N 5/02* (2006.01)
*F02B 41/06* (2006.01)

(52) U.S. Cl.
CPC . *F02G 1/02* (2013.01); *F01N 5/02* (2013.01); *F02B 41/06* (2013.01); *F02G 2257/02* (2013.01); *Y02T 10/16* (2013.01)

(58) Field of Classification Search
CPC ................ F02G 1/02; F01N 5/02; F02B 41/06
(Continued)

(56) References Cited

U.S. PATENT DOCUMENTS

| 4,300,486 A | 11/1981 | Lowther |
| 7,111,449 B1 | 9/2006 | Stebbings |
| (Continued) | | |

FOREIGN PATENT DOCUMENTS

| GB | 151683 | 9/1920 |
| GB | 1439446 | 6/1976 |
| WO | 8300187 | 1/1983 |

OTHER PUBLICATIONS

ISR, PCT/GB2010/001977, Oct. 25, 2010, 3 pages.
British Search Report, GB0918707.1, Aug. 27, 2010, 1 page.

*Primary Examiner* — Lindsay Low
*Assistant Examiner* — Kevin Lathers
(74) *Attorney, Agent, or Firm* — Price Heneveld LLP

(57) ABSTRACT

A non-compression engine having two or three variable volume mechanisms, an induction-displacer (1) and a combustion-expander (2) or an induction-displacer (1) and a combustion-expander (2) and an atmospheric-cooler (3). A working volume of gas is drawn into the induction-displacer, then displaced into the combustion-expander (2) at substantially constant volume passing through the regenerator (5). The gas in the combustor-expander (2) is further heated by combustion of a fuel then expanded to extract work. The gas is then displaced through the regenerator (5) into the atmospheric-cooler (3) at substantially constant volume, or exhaust from the regenerator at constant pressure. The gas is contracted in the atmospheric-cooler doing atmospheric work. Once the gas has equilibrated with the pressure of the atmosphere it is exhaust from the atmospheric-cooler (3).

24 Claims, 9 Drawing Sheets

(58) Field of Classification Search
USPC .......................................................... 123/39
See application file for complete search history.

(56) References Cited

U.S. PATENT DOCUMENTS 7,201,156 B1 * 4/2007 Wait ..................... F01L 1/28
 123/556
2004/0139934 A1 7/2004 Patton

* cited by examiner

HEAT ENGINE

The present invention relates to the field of heat engines, in particular positive displacement internal combustion engines of improved efficiency.

An internal combustion engine is a heat engine in which the working fluid is a gas often air or air mixed with exhaust products, containing a proportion of oxygen to which heat is added directly during the cycle by a combustion process within the working fluid.

The majority of requirements for mechanical power which cannot be met by connection to the electricity grid are met by internal combustion engines. Transport power requirements including automotive, heavy delivery vehicles, rail, marine and aviation engines are well known but there are many others including electrical power generation on a range of scales, powered tools used in agriculture, forestry, building and civil engineering, pumping of water, oil, and natural gas. Engines range in size from micro-machines weighing only a few grams which are being developed to replace batteries in some applications, to maritime propulsion units weighing 2300 metric tons.

The world supply of fossil fuels is thought to be approaching peak oil after which there may be fierce competition for the dwindling supply. A number of bio-fuels have been introduced or are under development but some of these compete with food crops for agricultural land use. In addition the effects on the environment of carbon emissions into the atmosphere are now widely acknowledged to be a cause of climate change. There is therefore great interest in improving the efficiency of internal combustion engines due to pressure from this combination of concerns.

It is well known in the field that engines of the current technology are only able to convert about a third of the energy available in the fuel into useful work. Of the remaining two thirds, in piston engines approximately one third is cycle-loss which leaves the engine as exhaust heat. The other third is cooling-loss, which is heat transferred from the working gas into the material of the engine, which is therefore lost to the cycle and which has to be dissipated by cooling fins or liquid filled radiators to protect the materials and processes in the engine. Improvement of the efficiency is a goal sought therefore by many workers in the field and the areas of cycle-loss and cooling-loss are the target of improvements in prior art. The present invention offers a substantial improvement in both areas.

In 1824 Sadi Carnot showed that no heat engine can achieve 100% efficiency. All engines receive heat at a higher absolute temperature $T_h$ and reject heat at a cooler absolute temperature $T_c$. The well known Carnot equation:

$$\eta = 1 - \frac{T_c}{T_h}$$

shows that the maximum efficiency $\eta$ which an engine can achieve is limited by the ratio of these temperatures. However it also shows that an engine operating between the adiabatic combustion temperature of common fuels at circa 2800K and ambient temperatures at circa 300K could have an efficiency limit of nearly 90%. Current engines are unable to exploit this range of temperatures.

The present invention fully exploits this range of temperatures and the Carnot limit of efficiency is therefore much higher.

Internal combustion engines are currently divided into positive displacement machines and kinetic flow machines. Positive displacement machines include piston engines and Wankel engines while kinetic flow machines include gas turbines. Positive displacement machines are characterised in that they draw in and process discrete working volumes of gas which are taken through a cycle involving changes of volume and the addition and rejection of heat.

They are divided into spark ignition and compression ignition engines operating on the two-stroke or four-stroke cycle. All of these engines have in common the compression principle. This principle was first set out by Alphonse Beau de Rochas in a pamphlet published in 1862. This accurately described the working principle of the four-stroke engine. In 1876 Dr Nikolaus Otto rediscovered this principle and built a successful engine. From that time onward the compression principle has been universal. The efficiency equation governing the Otto cycle, and the Joule-Brayton cycle which applies to gas turbines, is very well known in the field:

$$\eta = 1 - \frac{1}{r_v^{(\gamma-1)}}$$

where $\eta$ is the efficiency, $r_v$ is the volume ratio, commonly referred to as the compression ratio and $\gamma$ is the ratio of the specific heats of the working gas and has a value of 1.4 at ambient temperatures dropping to 1.29 at 2500K.

The Joule-Brayton cycle which applies to gas turbines has a similar efficiency equation.

$$\eta = 1 - \frac{1}{r_p^{(\gamma-1)/\gamma}}$$

In this equation $r_p$ is the pressure ratio.

The clear implication of these equations is that efficiency is improved by high compression ratios and furthermore that an engine which had no compression i.e. r=1 would have an efficiency of zero. A study of the early history of the internal combustion engine revealed that this is clearly not the case. Prior to the invention of the compression engine, non-compression gas engines were built and sold commercially. Etienne Lenoir patented a non-compression engine in 1860 and some 600 units were sold. Nikolaus Otto set up a company with Eugene Langen, which from 1862 sold an improved non-compression engine with better reliability and a higher efficiency. Analysis of the thermodynamic principles on which these engines were based revealed that the equation above is an artifact of engine cycles where the compression and expansion ratio are equal. Furthermore the term "compression ratio" puts a misleading emphasis on compression when it is in reality expansion which results in conversion of heat into mechanical power.

In 1710 Thomas Newcomen and John Cowley invented the atmospheric steam engine. Steam at low pressure was allowed to fill a cylinder. The subsequent condensation of the steam by cooling with water was used to create mechanical power via an atmospheric stroke whereby the vacuum produced allowed the pressure of the atmosphere to force a piston down the cylinder. By this means atmospheric work was extracted. In thermodynamic terms the atmospheric principle is sound as it allows the engine to reject heat at a low temperature. The engine had low efficiency because the hot and cool processes were carried out in the same enclosure so much heat was lost to the materials of the engine. This problem was later addressed by James Watt who connected the hot cylinder to a separate cold chamber by a pipe with a valve. Watt also started to use the positive pressure of the steam to produce power on the upstroke albeit at a low pressure.

In 1823 Samuel Brown developed an internal combustion engine based on the atmospheric principle. He used the rapid combustion of a gas-air mixture in the cylinder to expel most of the gas prior to cooling the remaining gas by water spray to create a partial vacuum which allowed the atmosphere to drive the piston. At this time there may have been a reluctance to use positive pressure to produce work due to the low and unreliable tensile strength of the materials available. The engine was used to propel a vehicle but had a low efficiency because the positive pressure produced by the combustion was vented to the atmosphere.

The non-compression engines of Lenoir and Otto operated by moving a piston through part of its stroke to draw in a mixture of air and lighting gas, then firing the mixture. The increase in temperature increased the pressure which would drive the piston for the remainder of its stroke. The rod and crank mechanism, which would have been well known from steam applications, was not used. In the Otto-Langen engine the piston was driven by the combustion pressure up a vertical cylinder until brought to rest by a combination of its weight and a partial vacuum which developed behind it as a result of the inertia of the piston having carried it past the position of equilibrium with atmospheric pressure. This partial vacuum was then increased by cooling the gas with a water spray. Atmospheric pressure forced the piston down the cylinder. As it descended it drove a flywheel via a rack which engaged with a pinion running on the flywheel shaft with a one way clutch. This engine therefore made use of both the pressure principle and the atmospheric principle. It operated over a wide temperature range though the cooling losses would have been high as the hot and cold processes took place in the same cylinder and therefore differs from the present invention.

After Otto's subsequent invention of the compression engine in 1876, which made use of the crank and rod mechanism, the development of the non-compression engine was almost entirely abandoned. Otto heavily promoted the compression principle in the belief that his patent gave him a monopoly on its production. Working with Gottlieb Daimler and Wilhelm Maybach, he had the industrial capacity to put his innovation into production. His patent failed however in 1886 when the pamphlet by Beau de Rochas came to light. This left the path clear for other manufacturers to introduce their own products.

Since then the compression engine has reigned supreme in the four-stroke or two-stroke guise with spark or compression ignition. The piston and cylinder is still the predominant variable volume mechanism with the Wankel engine making inroads in applications where power to weight ratio is more important than fuel economy. These engines all have in common a very similar compression based thermodynamic cycle and the feature that all the processes in the cycle take place in the same enclosure and therefore differ from the present invention.

A well known method of reducing cycle-loss is heat regeneration. The heat in the exhaust gas is collected and returned to a part of the cycle where its effect can replace heating by fuel and thereby reduce the amount of fuel required. Regeneration was first demonstrated in a hot air engine patented by Dr Robert Stirling in 1816. A regenerator is a gas to solid heat exchanger where a transient stream of hot gas flows through and heats a solid matrix. A transient stream of cool gas in contra-flow then recovers the heat. This technique is most beneficial in cycles where the heating gas and the heated gas are of the same mass, and are cooled and heated respectively in the same conditions and between the same temperature limits. This technique has met with some success in gas turbines. Due to the continuous flow nature of these engines the heat can be transferred by a gas-to-gas heat exchanger or a rotating matrix heat exchanger. The benefits of the technique are limited by the fact that it is impossible even in the ideal cycle for all the exhaust heat to be extracted as it would be necessary to cool the turbine exhaust to ambient temperatures. This is not possible because the heat must be transferred to the air at the outlet of the compressor and this air has been heated by the adiabatic compression process plus the isentropic losses and is therefore several hundred degrees above ambient temperatures. Thus only a proportion of the heat can be recovered. This situation can be improved if intercooling is used in the compression process.

A number of workers in the field have proposed methods for applying regeneration to positive displacement internal combustion engines. These can be classified as: internal combustion sterling engines; Otto engines with the addition of in cylinder regeneration; and split cycle engines where the intake and compression, and combustion and exhaust take place in separate cylinders, and regeneration occurs between the cylinders.

In a Stirling engine the hot and cold volumes are in permanent communication via the regenerator and therefore differ from the present invention. The air is moved into the hot space and gains heat from the regenerator. It then expands doing work while heat is transferred into the air maintaining its temperature. In an internal combustion Stirling engine this heat is supplied by combustion of fuel in the hot space. The hot temperature in the cycle is therefore limited to the material limits of the regenerator and hot cylinder. This temperature will be much lower than the adiabatic combustion temperature of the fuel so although the Stirling cycle is theoretically able to approach its Carnot limit the limit will be less than a cycle which could work to the adiabatic combustion temperature.

In the Otto cycle all the processes occur in one cylinder. This has the benefit of simplicity and permits the piston and cylinder to remain at a comparatively low temperature while at the same time the top temperature in the cycle is the adiabatic combustion temperature of the fuel. The disadvantage is that the cycle efficiency is a function of the ratio of the combustion temperature and the exhaust temperature. The exhaust temperature is much higher than ambient temperature and the cycle efficiency is thus lower than the Carnot efficiency of an engine using the same higher temperature. Also the materials comprising the containment are much cooler than the process itself so the cooling-losses are high. Attempts have been made to put a moving regenerator within the cylinder. This complicates the combustion process and due to the temperature rise from compression and it is only possible for a proportion of the heat to be regenerated. The cooling loss problem is not addressed.

Split cycle engines permit the cool process to be done in a separate cylinder from the hot process and the regenerator can be in the path between the cylinders. The use of compression means that the combustion pressures are high and poppet valves are used to control the flow. These have the effect of creating a significant dead volume due to the curved passage required behind the valve. The compression temperature rise limits the proportion of regeneration. These cycles go some way towards reducing the cooling loss but if conventional oil lubrication of the piston is used, this limits the wall temperature to below 300 Celsius. The use of dry lubrication has been suggested. This method is known from special research engines which feature an optical window into the combustion area. The friction losses are very high which is acceptable in this specialist application but not in a practical engine.

None of the hitherto proposed improvements can, even in the ideal cycle, recover all of the exhaust heat. Furthermore none of the improved engines offer a significant saving in cooling-loss. For this reason they usually claim a 10 to 15% improvement in efficiency compared with an engine with no regeneration. It is the objective of the present invention to achieve a much greater improvement of 30 to 40% taking the total efficiency to between 70 and 80%. This is achieved by recovering substantially all the exhaust heat and at the same time significantly reducing cooling losses.

The present invention may use non contact seal techniques including labyrinth seals or linear air bearings. There are many occasions in engineering when fluid at pressure has to be contained within an enclosure while at the same time the mechanical transmission of rotary or linear motion into the enclosure is required. On most occasions a compliant seal can be used which is mounted on one surface and bears against a smooth surface in relative motion to restrict or prevent the flow of fluid while imposing some degree of friction loss. There are circumstances however when such solid seals are not possible due to the high speed of motion, high temperature or because some loss of pressure can be tolerated in exchange for the reduction in friction loss. On these occasions non contact seals are used.

For a labyrinth seal, the surfaces in relative motion are separated by a small clearance. The flow of gas through the gap is minimised by creating features on the surfaces designed to create the maximum resistance to flow. Labyrinth pistons are pistons mounted solidly on a piston rod. This rod is constrained by a linear bearing and guides the piston up and down the cylinder without contact with the cylinder walls. The piston has a ridged profile on its flanks which create resistance to the flow of fluid through the gap. This technique is used with success by Burckhardt Compression AG of Switzerland in pumps which operate at cryogenic temperatures where the use of oil lubricants is ruled out. Materials with low expansion coefficients are used to minimise variation in the piston diameter with temperature to permit the minimal clearance to be maintained.

For a linear air bearing to be used, a supply of compressed air is ducted so as to emerge at a number of points around the flank of the piston. The piston is again operated by a piston rod which does not apply off axis forces to the piston. The piston is guided in the cylinder bore without contact as when it becomes closer to one side of the bore the supporting force of the air will be greater tending to re-centre the piston.

PRIOR ART

Thomas Newcomen and John Cowley in 1710 demonstrate the Atmospheric Steam Engine.

Samuel Brown. U.S. Pat. No. 4,874 of 1823 "Effecting a vacuum and thus producing powers". The patent disclosed an internal combustion atmospheric engine.

Robert and James Stirling. U.S. Pat. No. 5,456 of 1827 discloses an air engine incorporating the heat regeneration principle.

Lenoir. U.S. Pat. No. 335 of 1860 "Improvements in obtaining motive power and in the machinery or apparatus employed therein" discloses a non-compression internal combustion engine.

Nikolaus Otto. U.S. Pat. No. 2,098 of 1863 discloses an engine which derives power from a combination of non-compression combustion and a cooled atmospheric stroke.

Eugene Langen and Nikolaous Otto. U.S. Pat. No. 434 0f 1866 disclose an improved version of Otto's 1863 engine.

Hirsch. U.S. Pat. No. 155,087 1874 discloses an internal combustion Stirling cycle engine. Interesting features are a refractory lined hot cylinder and spontaneous combustion of the fuel in the hot cylinder. Water spray cooling is used in the cool cylinder. In this engine the majority of the working gas is cycled back and forth through the regenerator between the hot cylinder and the cold cylinder. A small amount of fresh air and fuel is pumped into the hot cylinder; the resulting combustion maintains the temperature of the hot cylinder. The method of providing a refractory lining would have limited the engine to low speed operation. The isothermal combustion would provide a top temperature $T_h$ in the cycle much lower than the adiabatic combustion temperature. Thus although the cycle could potentially approach its Carnot efficiency, the Carnot efficiency would be lower than the present invention and its operation is based on an entirely different cycle.

C. W. Siemens. U.S. Pat. No. 2,504 of 1881 discloses an internal combustion engine with a regenerator built into the cylinder head.

Wait. U.S. Pat. No. 7,201,156 correctly suggests that regeneration might permit the engine to be efficient at low compression ratios but does not suggest a non-compression engine. The engine disclosed has a conventional four-stroke cycle but with the exhaust heat added prior to the compression stroke. This allows good heat recovery as there is no compression heating prior to the transfer. Unfortunately there is no benefit in adding heat at this point in the cycle as there is no method of converting it into power. To do so would certainly complicate the cooling and combustion process.

Koenig. U.S. Pat. No. 111,184. This engine is a split cycle engine where the compressor cylinder is smaller than the expansion cylinder. The need to minimise compression heating prior to regeneration is acknowledged by providing the compression cylinder with a high internal surface to reduce the polytropic index. Good understanding of thermodynamics is demonstrated but tiny valve areas by todays standards are shown in diagram. The problem of cooling the power cylinder is not addressed.

Coney et al. US2003049139. This engine disclosed develops Koenig's idea by using a very high degree of compression with spray cooling to render the compression process almost isothermal. This facilitates a good level of exhaust heat recovery but the exceptionally high pressures used will militate against cooling loss reducing measures. The engine disclosed is aimed at large power generation applications and as such are very complicated with several heat exchangers. They are therefore unlikely to be economic in smaller applications.

Patton. U.S. Pat. Nos. 7,004,115 and 7,219,630 also identifies the benefits of low compression in a regenerative engine but does suggest a non-compression engine. He discloses an engine with regeneration but no cooling loss reducing measures.

Graves. U.S. Pat. No. 3,729,927 1972 discloses a non-compression engine which differs from a Lenoir engine in that the combustion takes place in a separate chamber and the expanding products enter the cylinder via a flap valve. This enables the whole of the piston stroke to be used for expansion. The separate combustion chamber will have high cooling losses and the flap valve will run very hot. Regeneration is not used and no claim for high efficiency is made.

WIDÉN, Karl-Olof, Magnus. WO/1983/000187 discloses a non-compression engine. This is in effect a Lenoir engine fitted with a rod and crank mechanism. Regeneration is not used and no claim for high efficiency is made.

U.S. Pat. No. 4,300,486 Lowther 1979. This patent suggests the use of a non-compression engine primarily for automotive use where the combustion process is supplied with compressed air from a cylinder. Thus the energy production process still uses a compression cycle but the process is split such that the energy for compression does not come from the fuel carried in the vehicle. There is no suggestion of the use of a regeneration process. It therefore differs from the current invention.

JP 1439446 Nissan Motor Company 1973. A piston expander is driven by the explosive reaction of a fuel and a liquid oxidant such as hydrogen peroxide or liquid oxygen without the use of atmospheric air. There is therefore no need for compression. There is no suggestion of the use of regeneration. It therefore differs from the current invention.

U.S. Pat. No. 7,111,449 B1 Stebbings 2006. A jet engine is proposed which has a gas recirculation system in place of the conventional turbine and rotary compressor. It is clear from Claim 1 however the objective of this system is to provide compression. It is also claimed that the heat from the recirculated gas will provide a beneficial heat recovery effect. However, as with Wait, the heat is applied to the system prior to the compression stage where its effect will be counterproductive. This is therefore a compression engine.

Thus in none of the above prior art is the combination of a non-compression engine with regenerative means disclosed.

It is an object of the present invention to alleviate the problems of the prior art at least to some extent.

According to a first aspect of the present invention there is provided a non-compression engine arranged to operate in a cycle and including energy regeneration means.

The non-compression engine may have variable volume means arranged to operate in the cycle and the energy regeneration means may be arranged to return a proportion of energy leaving the variable volume means back to the variable volume means. The non-compression engine may include means for drawing a working volume of gas into the engine.

The energy regeneration means may be arranged to supply heat to the working volume of gas at substantially constant volume. The energy regeneration means may be arranged to take energy from working gas in the cycle of the variable volume means and to return it as heat in a later cycle of the variable volume means.

The variable volume means may include a combustion-expander. The non-compression engine may include a fuel inlet located for the introduction of fuel into the combustion-expander for combustion therein. The combustion-expander may comprise a piston and cylinder. The combustion-expander may have a labyrinth seal or an air bearing means between moving parts thereof. The combustion-expander may comprise a combustion chamber connected through a nozzle to a turbine wheel. The combustion-expander may be constructed from a heat-resistant material selected from a group including stainless steel, high temperature alloys and engineering ceramics.

The non-compression engine may include a valve system for controlling the flow of the working gas to or from the energy regeneration means. The valve-system may include a movable member having the energy regeneration means located thereon. The movable member may comprise a rotatable disk arranged to provide rotational movement of the energy regeneration means between a first position in which it provides energy to working gas entering the combustion-expander and a second position in which it takes heat from working gas leaving the combustion-expander.

The variable volume means may include an induction-displacer having an induction valve. The induction-displacer may comprise a piston and cylinder.

The valve system may be arranged to control communication between the combustion-expander, the induction-displacer and the energy regeneration means.

The variable volume means may include an atmospheric stroke means. The atmospheric stroke means may include an atmospheric cooler. The atmospheric cooler may include a spray system for spraying liquid into the gas to remove heat. The liquid may be water and may include additives. The atmospheric cooler may comprise a piston and cylinder. The atmospheric cooler may have an exhaust valve communicating with atmosphere.

The non-compression engine may include a crankshaft configured to drive the induction-displacer, the combustion-expander and the atmospheric cooler. The combustion-expander and the atmospheric cooler may be driven 180 degrees out of phase with each other. The induction-displacer may have a shorter stroke than the combustion-expander and the atmospheric cooler. The non-compression engine may include a face cam and a cam follower driveable by the crankshaft to control the induction-displacer. The non-compression engine may include valves operable in a displacement mode by a camshaft to eliminate dead volume when closed.

The valve system may be configured to control communication between the combustion-expander, the induction-displacer, the energy regeneration means and the atmospheric cooler.

The energy regeneration means may include a regenerator element arranged to accumulate, store and give out energy, the regenerator element incorporating a flow path for allowing working gases to flow therethrough.

The aim of the present invention is to increase the efficiency of internal combustion engines. The starting point is a non-compression engine which confers a number of advantages leading to an engine with very high cycle efficiency and a substantial reduction in cooling losses. Eliminating compression means that the working gas is initially at ambient temperature and can therefore accept a high proportion of the exhaust heat. To realize a benefit from this heat it is necessary to confine the gas at a constant volume during the heat regeneration. To avoid cooling losses the cool induction processes should be done in a separate containment from the hot process. The hot process containment should ideally be able to operate at a temperature between the regeneration temperature and the combustion temperature. This will be between 1000K and 2000K depending on the top design temperature and the expansion ratio used. Thorough analysis of this first embodiment of the present invention revealed that it was not quite capable of meeting the ideal objective of regenerating all of the exhaust heat. This is because the exhaust to the atmosphere through the regenerator would be a constant pressure process while the regenerative heating of the gas is a constant volume process. The heat capacity of the gas at constant volume is only 70% of the heat capacity at constant pressure so although the mass flow and temperature limits are the same the energy transferred would be different. The regenerator would not therefore be fully cooled and would not therefore be able to cool the exhaust to ambient temperature. There would therefore be some cycle loss.

A second embodiment of the present invention makes good the deficiency identified above. After expansion the gas is displaced through the regenerator into a further variable volume mechanism of equal volume such that the displacement occurs this time at constant volume. The regeneration can now be complete. Furthermore the gas is now still in its expanded volume but has returned to ambient temperature. The pressure will therefore be well below atmospheric pressure. Atmospheric work can be done by allowing the force of the atmosphere to make the gas contract. However if this is done the gas will undergo adiabatic heating with the result that the exhaust will be above ambient temperature. This can be reduced to some extent by cooling the cylinder. The contraction can be rendered almost isothermal however if water is sprayed into the gas as it contracts. By this means the heat rejection event in the cycle will be substantially at ambient temperature maximizing the Carnot efficiency. If there is an opportunity to cool the water supply below ambient temperatures by the use for example of a waste power driven refrigeration system or evaporative cooling in a cooling tower, a further improvement in efficiency could be gained.

The first embodiment of the present invention provides an engine which is less efficient than the second embodiment of the present invention, though more efficient than engines of the current technology. Such an engine may find applications in areas where minimum cost and size are of critical importance.

Water spray cooling of the contracting gas will have the additional benefit that it will condense out the water formed by combustion of fuels containing hydrogen causing a further pressure drop. Modern engines are required to emit very limited amounts of oxides of nitrogen (NOx) which are formed during high temperature combustion. These gasses have a limited solubility in cool water so the process will have some benefit in scrubbing the exhaust. This may be improved by the additive reagents. Oxides of sulfur which can also be produced if sulfur containing fuel is burned are very soluble in cold water. Some carbon dioxide will be dissolved in the cool water. Alternatively an alkali hydroxide solution could be used to remove $CO_2$ from the exhaust. The resulting carbonate could be processed in a carbon sequestering scheme. Another strategy to contain the production on NOx is to ensure that when the engine is running at part load and therefore reduced fuel supply that there is no excess oxygen. This can be done by controllably mixing exhaust gas with the intake air. This process is simplified by the fact that the exhaust gas leaving the engine is cold. Alternatively NOx production can be reduced by limiting the top temperature of combustion. At temperatures below 1700K virtually no NOx is produced and it is produced in limited amounts up to 2000K. This reduced temperature does have the effect of reducing the efficiency but this effect is limited due to the unusually cool temperature of heat rejection. It will be evident that the exhaust contains very little energy and will therefore exit the engine quite quietly. The measures described above will result in a cool exhaust and will therefore ensure that the cycle losses are minimised.

The cooling loss problem remains due to the difference in temperature between the hot combustion and expansion processes and the materials that form the containment. This temperature difference will cause a convective flow of heat into the material proportional to the temperature difference. The radiation flow is proportional to the difference between the forth powers of the gas and wall temperatures. The surface temperature of the containment is usually limited by the requirement to provide a sliding seal within the variable volume mechanism. With oil lubricants the wall temperature is usually between 150 and 300 Celsius. For this reason there is no requirement to use high temperature resistant materials. This means that in a conventional engine heat flows out of the hot process throughout the entire hot part of the cycle. The lower pressures which result from the non-compression process make the use of non-contact seals feasible. This eliminates the temperature limitation imposed by sliding seals making the high temperature properties of the materials the limiting factor. Most materials have lower strength as temperature increases but again the low pressure regime in which the non-compression engine operates makes lighter demands of the materials compared to an engine operating at higher pressures or turbine machines where the centrifugal loads are very high.

Technical ceramic materials including alumina and silicon carbide have favorable properties including strength at high temperatures and low expansion coefficient. Thermal stress and thermal shock will be important design considerations. It has been an objective of many workers in the field to apply these materials to conventional engines however there is greater synergy between the properties of these materials and the demands of non-compression engines. Thin walled structures are preferable in these circumstances and a further advantage of the non-compression engine is that the operating pressure is approximately an order of magnitude lower than a compression engine making a thin walled containment feasible. The present invention may have application across the range of sizes known in current engines. Where the hot containments components are comparatively small it will be preferable to make them entirely from ceramics. Where they are larger, ceramic lined metal structures would be preferable. By this means a wall temperature of the confinement in the region of 1400 Celsius is possible. Heat transfer from the gas to the wall will therefore be significantly reduced. An alternate embodiment could use high temperature alloys including Haynes 118, Haynes 230, Hastelloy X or stainless steel materials including Fecralloy or refractory metals including tungsten or tantalum for the hot containments.

A further advantage conferred by the comparatively low working pressure of the non-compression engine is that it is not essential to use poppet valves to confine the gas within the expander. Poppet valves have the disadvantage that they must have a curved passage behind them to permit the valve guide to be supported within the passage wall. This means there is a substantial dead volume of gas which is a particular disadvantage in an engine where the cycle processes occur in more than one containment. Valves which operate by controllably aligning ports within lamella members by the relative translation of one or both members can be used at the pressures generated in non-compression engines. The translation can be linear, rotary or follow a more complicated path defined by cam plates, link mechanisms, servo mechanisms or any other known means. A rotary mechanism has the advantage that a circular non contact seal can be used to contain the pressure. This may be useful as the component will be too hot for conventional lubrication methods. The lower pressure and the fact that the unit is only pressurized during the expansion stroke means that a non-contact seal could be used without incurring unacceptable losses. A ball-race means may be used to facilitate the rotation.

Alternatively a valve system may be used which is designed to minimize dead space. This can be achieved if the moving element which opens and closes the valve has a close fit in the cross-section of the housing similar to a piston within a cylinder. When the valve face is lowered onto its seating to close the valve the gas within the valve is displaced by the piston action. This system will permit the use of a static regenerator. This obviates one of the disadvantages of the moving regenerator where the usable temperature of the regenerator matrix may have to be limited to ensure that there is sufficient strength left within the material to sustain the stresses caused by movement.

A further advantage of the present invention is that the combustion conditions differ from conventional engines. In conventional compression ignition engines fuel is sprayed into the gas which has been heated by compression. The droplets are heated and begin to evaporate as the vapour pressure exceeds the pressure of the gas. The gas pressure is very high so the boiling point of the fuel is also high. Furthermore there is a layer of air next to the containment walls which is much cooler and has a quenching effect on the combustion. In the present invention the temperature of the gas is similar or higher than a conventional compression ignition engine while the pressure is much lower. The fuel will therefore evaporate more quickly. Furthermore the high wall temperature will eliminate the quenching effect in this area. It will therefore be possible to design engines to operate on a wide range of fuels including in some applications powdered solid fuels.

A further advantage of non-compression engines is that they have a high work ratio. This is the ratio of the net work output of the engine compared to work done on the working stroke. In compression engines the work ratio is reduced by the need for compression work. An advantage of engines with a high work ratio is that the practical efficiency tends to be closer to the theoretical efficiency when compared to engines with a lower work ratio.

A further advantage attributed to the low pressures in non-combustion engines is containment walls can be thinner. This has the effect of reducing the mass of the engine which is of benefit in itself particularly in transport applications and also reduces the thermal mass. This means that if the engine is used for intermittent requirements the losses involved in heating the mass of the engine will be minimised. In addition the easy starting which results from there being no requirement to turn the engine through a compression stroke makes it more convenient to shut the engine down during periods when no power is required thereby substantially reducing the wasteful process of idling. In some applications such as maritime propulsion it is convenient to run the engine from time to time in the reverse direction as this eliminates the requirement for a gearbox. Provided the operating mechanism for the valve and the induction-displacer is correctly designed this is possible. The description so far has applied to a single working module which is the equivalent of a single cylinder conventional engine. The present invention applies equally to multi-module designs which would be the equivalent of multi cylinder conventional engines. A multi-module unit would offer the advantage of smoother power delivery and canceling of inertial forces from reciprocating components and could be designed to self start. It will be noted from the detailed description below that the engines have either two or three variable volume mechanisms for each module. In multi-module units it may be convenient for packaging reasons to have differing numbers of each type of variable volume mechanism. For example one induction-displacer may serve more than one combustion-expander.

An undesirable characteristic of compression engines is that if the engine is run below a minimum speed it will not be able to complete the compression stroke and stalling will occur. The non-compression engine has no equivalent characteristic. If it is loaded beyond its capacity to maintain its speed it will slow smoothly ultimately to a standstill.

Many of the components used are superficially similar to components used in prior art engines. The functions differ however so to avoid confusion the following terms are defined:

A non-compression engine is a positive displacement engine in which on a cyclic basis discreet volumes of gas are draw into the engine and then heated to increase its pressure without first having the volume reduced in a compression process.

A regenerative engine is an engine in which heat remaining in the gas after expansion is captured and returned to a subsequent cycle at a point where its heating effect can be used to reduce the amount of heating required by combustion. This reduces the fuel requirement and therefore increases the efficiency.

A regenerative means is any arrangement of components which can facilitate the regeneration of heat. All thermodynamic cycles which are capable of producing mechanical power accept heat at a higher temperature at one phase within the cycle then reject heat at a lower temperature later in the cycle. Some or all of the rejected heat must therefore be stored for a period of time until the heating event in the following cycle. The regenerator defined below is a preferred method of achieving this. An alternative method is a heat exchanger where two volumes of gas in flow are separated by a solid surface which has a large area and which is able to conduct heat from the hotter flow to the cooler flow. The temporal mismatch between the heat rejection and the acceptance events can be addressed by having an engine with a plurality of modules. The phase difference between two modules is arranged such that the heat rejection event in one coincides with the heat acceptance event in the other and the flows are so interconnected as to permit the rejected heat in one module to be accepted in the other.

A variable volume mechanism is a mechanism which can vary its internal volume. When used in conjunction with a valve system the volume variation can cause gas to be displaced into or out of the mechanism. When the valve system confines the gas within the variable volume mechanism, varying the volume of the mechanism will vary the volume of the gas. A piston moving in a cylinder is the most well known variable volume mechanism and is the preferred mechanism for the present invention although many other variable volume mechanisms are known and the present invention applies equally to these. Preferably the minimum volume or clearance volume should be made as small as possible to reduce dead volume.

An induction-displacer is a variable volume mechanism which draws in and confines a volume of gas. It then displaced this gas substantially at constant volume into the combustion-expander.

The combustion-expander is a variable volume mechanism of greater maximum volume than the induction-displacer by a ratio of between 2 to 20 times and preferably between 5 and 12 times. It receives the volume of gas from the induction-displacer during the first part of its stroke, wherein the rate of volume increase is made substantially the same as the volume decrease in the induction-displacer. The gas remains therefore at substantially constant volume. A combustion process takes place in the combustion-expander either during the displacement or immediately after the displacement. It then completes its stroke permitting the hot gas to expand converting some of the heat into work. The return stroke then displaces the gas from the combustion-expander into the atmospheric-cooler.

An atmospheric-cooler is a variable volume mechanism of substantially the same maximum and minimum volume as the combustion-expander. The atmospheric-cooler receives the gas displaced from the combustion-expander at substantially constant volume during the whole of its volume increasing stroke. The walls of the atmospheric-cooler are maintained at a low temperature and it may be fitted with an internal spray system which can spray a cool liquid into the gas to remove heat. As the cooled gas is below atmospheric pressure the volume reducing stroke of the atmospheric-cooler produces atmospheric work. Once the gas pressure equilibrates with the atmosphere a valve opens to the atmosphere and the gas and any water is displaced into the atmosphere or into an exhaust system which can separate the water from the gas and conduct a proportion of the gas to an intake plenum if required or to a suitable discharge point. In an alternate embodiment the expansion and resulting mechanical power conversion may be accomplished by expanding the gas through a nozzle to impinge on the blades of a turbine wheel.

A valve-system is a mechanism which can controllably open and close ports enabling gas flow between the induction-displacer and the combustion-expander and between the combustion-expander and the atmospheric cooler.

An induction valve is a controlled or self acting valve which permits the flow of gas from the atmosphere or from an induction plenum chamber into the induction-displacer.

An exhaust valve is a controlled or self acting valve which permits the flow of gas from the atmospheric-cooler to the atmosphere or to an exhaust system.

The regenerator is a finely divided structure including a parallel plate array, a tube array or a stack of mesh elements, having a high surface area and preferably having a total thermal capacity greater than the amount of added heat remaining in the gas after expansion. The structure and materials will be such as to withstand the temperature of the gas and the thermal shock of the temperature cycle. It will be sited where the valve system can route the flows between the induction-displacer and the combustion-expander and the combustion-expander and the atmospheric-cooler, via the regenerator. In some embodiments it may be integral with the valve system.

Embodiments of the present invention described herein are non-limiting.

DESCRIPTION OF THE DRAWINGS

Embodiments of the present invention will now be described solely by way of example and with reference to the accompanying drawings in which.

The combination of a non-compression engine having at least one variable volume mechanism and a regeneration means whereby a working volume of gas is drawn into the said engine and the said gas is supplied with heat at substantially constant volume without the said gas first undergoing compression and a proportion of the heat is supplied to the said gas by the regeneration means by transfer from a subsequent stage in an earlier cycle.

A first preferred embodiment of the present invention comprises two variable volume mechanisms, an induction-displacer 1 and a combustion-expander 2. The working volume of gas is drawn into the induction-displacer 1. It is then displaced into the combustion-expander 2 at substantially constant volume passing through the regenerator 5 and with heat being transferred from the regenerator 5 to the gas. The gas in the combustion-expander 2 is then further heated by combustion of a fuel then expanded to extract work. The gas is then displaced to exhaust from the combustion-expander 2 through the regenerator 5 with heat being transferred from the gas to the regenerator 5. During the operation of the combustion-expander 2 the induction-displacer 1 draws in the next working volume of gas and the cycle is then repeated.

A second preferred embodiment of the present invention comprises three variable volume mechanisms, as induction-displacer 1 and a combustion-expander 2 and an atmospheric-cooler 3. The working volume of gas is drawn into the induction-displacer 1. It is then displaced into the combustion-expander 2 at substantially constant volume passing through the regenerator 5 and with heat being transferred from the regenerator 5 to the gas. The gas in the combustion-expander 2 is then further heated by combustion of a fuel then expanded to extract work. The gas is then displaced at substantially constant volume into the atmospheric-cooler 3 through the regenerator 5 with heat being transferred from the gas to the regenerator 5. The gas is now below atmospheric pressure is contracted in the atmospheric-cooler 3 doing atmospheric work. Optionally a water spray within the atmospheric-cooler 3 may be used to render the contraction substantially isothermal. Once the pressure of the gas within the atmospheric-cooler 3 has equilibrated with the pressure of the atmosphere it exhaust from the atmospheric-cooler 3. During the operation of the combustion-expander 2 and atmospheric-cooler 3, the induction-displacer 1 draws in the next working volume of gas and the cycle is then repeated.

In both embodiments of the present invention the combustion-expander 2 is preferably designed to operate at a high temperature by constructing it from high temperature materials including stainless steel, high temperature alloys and engineering ceramics, and the sliding seal mechanism which facilitates the volume variation should be of a non-contact kind including a labyrinth seal or an air bearing means.

Figure 1:
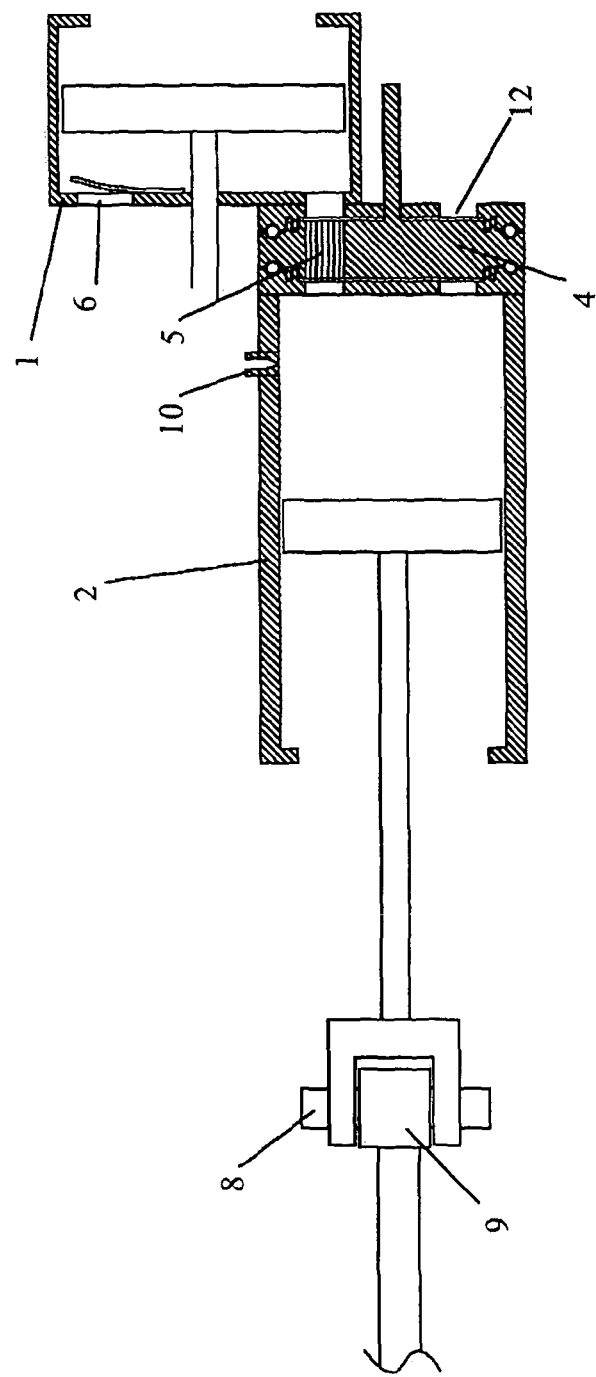
FIG. 1 illustrates a possible arrangement for the first embodiment of the present invention.
Figure 2:
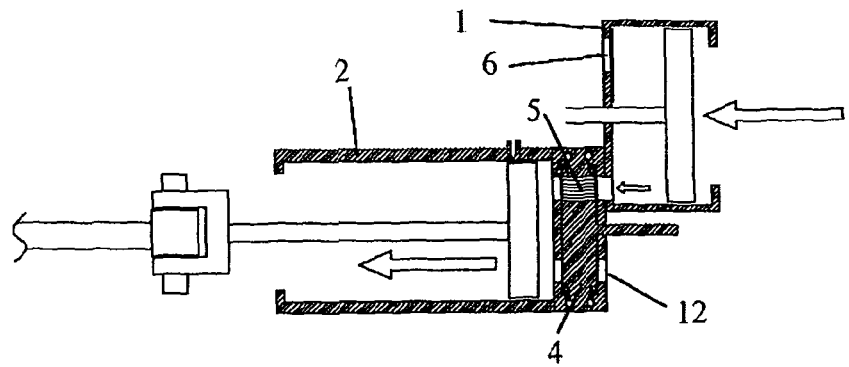
FIG. 2 illustrates the displacement phase of operation of the first embodiment of the present invention.
Figure 3:
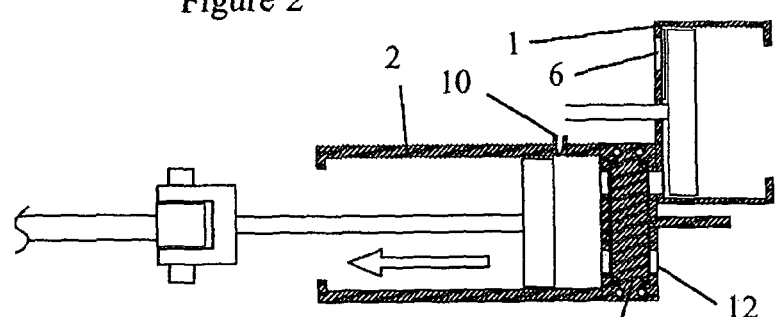
FIG. 3 illustrates the combustion phase of operation of the first embodiment of the present invention.

With reference to FIG. 1, the engine of the first preferred embodiment of the present invention comprises at least one variable volume mechanisms of smaller working volume and at least one variable volume mechanisms of larger working volume. A piston and cylinder is a well know example of a variable volume mechanism but many more are known including vane, screw, scroll and diaphragm mechanisms and mechanisms where a piston analogue moves or reciprocates along a circular path within a rotationally symmetrical bore and those based on an epitrochiod chamber similar to the Wankel engine. The smaller variable volume mechanism is the induction-displacer 1. The larger variable volume mechanism is the combustion-expander 2. The variable volume mechanisms are in controllable communication with each other via a valve-system 4 which incorporates the regenerator 5 and which preferably has a minimum internal volume. In the illustration the valve takes the form of a disk which runs on ball bearings with a labyrinth seal surrounding the gas path. In some embodiments such as those of a larger scale it may not be appropriate to mount the regenerator 5 on a moving valve-system 4 component so an alternative arrangement which separates the valve-system 4 components from the regenerator 5 would be preferred. Rotation of the disk can move the regenerator 5 in line with the passage from the induction-displacer 1 or the exhaust port 12 or in an intermediate position when both ports are closed. The induction-displacer 1 is in communication with the atmosphere via an induction valve 6 which may be controlled or self-acting as illustrated. The combustion-expander 2 is in communication with the atmosphere via a controllable valve-system 4 which directs the combustion gases to the exhaust port 12 to the atmosphere via the regenerator 5.

Figure 12:
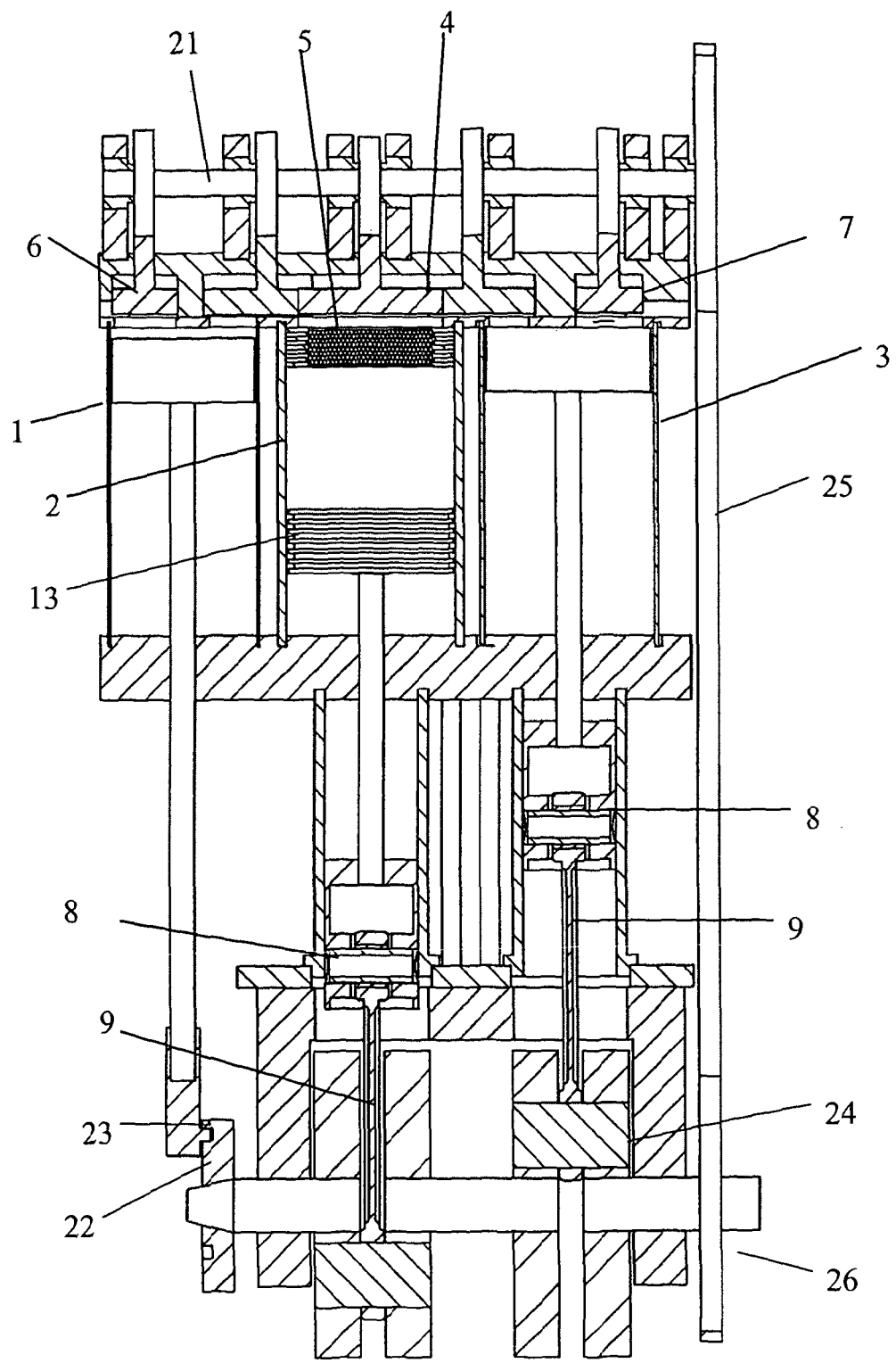
FIG. 12 illustrates an embodiment of the present invention wherein an induction-displacer, combustion-expander, and atmospheric-cooler are all driven from the same direction.

The induction-displacer 1 and the valve-system 4 are operated by timing mechanisms 25 (see FIG. 12). These may be mechanically connected to the reciprocating components, by mechanisms including levers, linkages cam plates or rack and pinion, or to the rotating components by various mechanisms including cam systems. Alternatively they may be driven electrically, hydraulically or pneumatically under the control of an engine management system. This may have advantages in engines which have to operate over a wide range of load and speed conditions.

Figure 4:
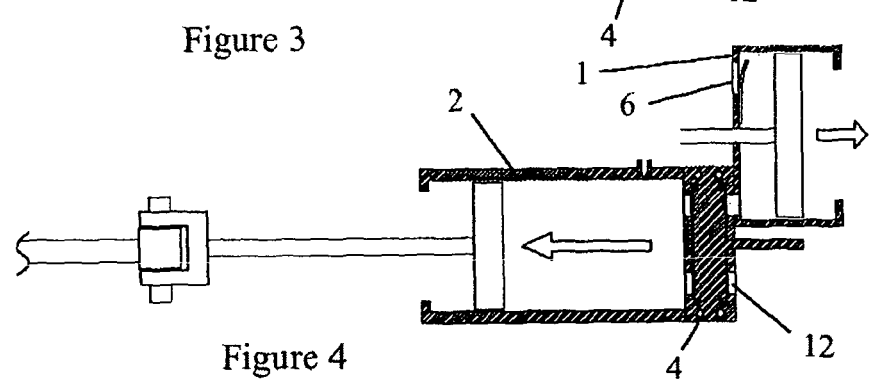
FIG. 4 illustrates the expansion phase of operation of the first embodiment of the present invention.
Figure 5:
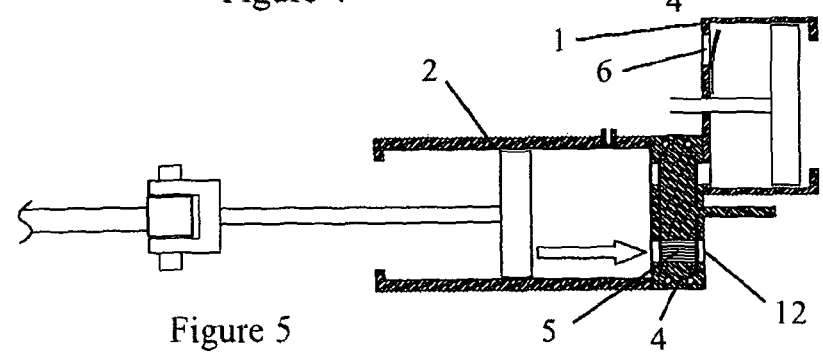
FIG. 5 illustrates the exhaust and induction phase of operation of the first embodiment of the present invention.

With reference to FIGS. 4 and 5, in operation air is drawn into the induction-displacer 1 from the atmosphere and confined by the induction valve 6. The direction of movement of the pistons in the illustrations is indicated by arrows. With reference to FIG. 1 the valve-system 4 then puts the induction-displacer 1 in communication with the combustion-expander 2 via the regenerator 5 which is in its hot state. The air is then displaced through the regenerator 5 and becomes hot while the regenerator 5 becomes cool. This displacement is at substantially constant volume because the volume in the combustion-expander 2 increases at the same rate as the volume of the induction-displacer 1 is reduced. The valve-system 4 then moves into a closed position isolating the gas within the combustion-expander 2. A fuel which may be a combustible liquid, gas or powdered solid is injected from a least one injection nozzle 10 into the hot gas resulting in combustion and further heating of the gas. Combustion can occurs either during the displacement which has the advantage that the combustion is at constant volume but the disadvantage that induction-displacer 1 is subjected to the combustion pressure. Alternatively the combustion may occur after the valve has closed which will mean that the induction-displacer 1 is not subjected to the combustion pressure but the combustion will not be at constant volume unless a mechanism is employed which varies the volume in the combustion-expander 2 in a discontinuous manner. The combustion-expander 2 then expands the gas as in FIG. 4 through a volume ratio of between two and twenty times. Work is transferred during this expansion and may be converted into mechanical, electrical, hydraulic or pneumatic output, by any known means. In the illustration a connecting rod 9 is shown which could be connected to a crank shaft. Note that the motion of the pivot pin 8 and the piston rods is constrained by linear bearings which for clarity are not shown. With reference to FIG. 5, at the end of the expansion stroke the valve-system 4 puts the combustion-expander 2 into communication with the atmosphere via the regenerator 5 which is in its cool state. The combustion gas is displaced at constant pressure into the atmosphere giving up its heat to the regenerator 5 which returns to its hot state. While the combustion-expander 2 expansion and exhaust processes are taking place the induction-displacer 1 has taken in a new charge of gas. The cycle is then repeated.

Figure 6:
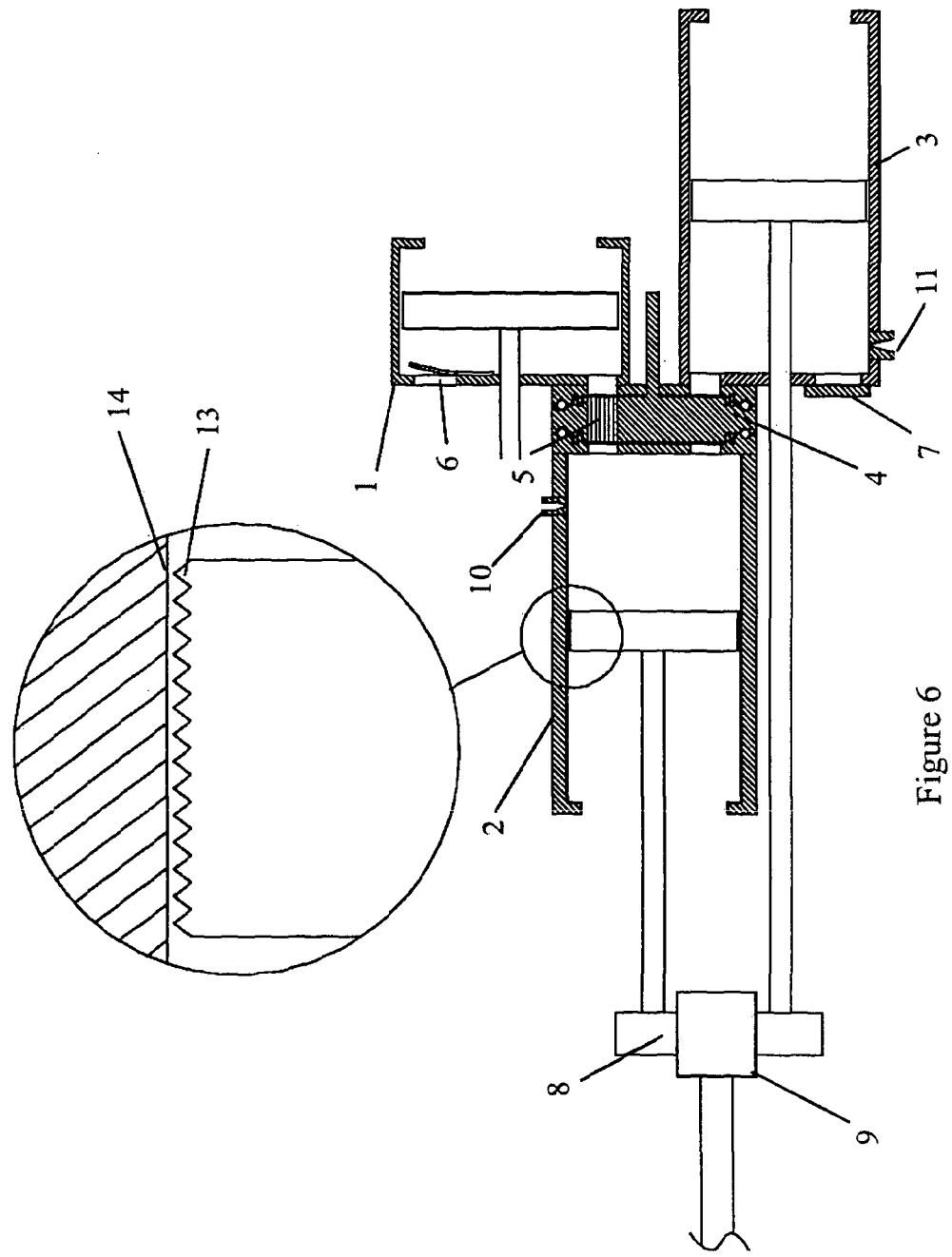
FIG. 6 illustrates a possible arrangement for the second embodiment of the present invention.

The regeneration has thus substantially reduced the cycle loss. The cooling loss is minimised by allowing the combustion-expander 2 to operate at a very high temperature. To facilitate this, the combustion-expander 2 is made from heat resistant materials from a group including stainless steel, high temperature alloys or engineering ceramics. With reference to FIG. 6 the issue of lubrication of the sliding seals is avoided by arranging for the components to be guided by linear bearings which are not shown in the illustration and to run at a small clearance using either a labyrinth seal or an air bearing means. The illustration shows the ridged piston flank 13 running close to but not in contact with the cylinder wall 14. In other embodiments the ridges may be formed on the cylinder wall 14 while the piston flank 13 is smooth, or both the piston flank 13 and cylinder wall 14 may be ridged. This approach would be unfeasible in a compression engine due to the length of time within the cycle that the gas is under pressure and the degree to which the gas is pressurised, which would cause unacceptable pressure losses. The method has the further advantage of eliminating the friction loss in the combustion-expander. By minimising both the cycle losses and the cooling losses the cycle will have a high efficiency. In addition the low pressure will enable the combustion-expander 2 to have a thin-walled light weight construction. The absence of a compression stroke will render the engine easy to start and it will require little flywheel effect.

Once the engine is at its working temperature the hot regenerated gas and the incandescent containment will cause the fuel to burn spontaneously upon injection with no quenching effect near the walls. That will give the engine the ability to operate with a wide range of fuels. However for cold starting an ignition system will be required. This could be done by any known means including a glow-plug, spark plug, electrically heated regenerator, heating all or part of the cylinder electrically or by combustion or by a laser based ignition system. Some fuels which would burn well in the hot engine may be unsuitable for the start up phase of operation so in this case an auxiliary start-up fuel system would be provided.

The first embodiment of the present invention is susceptible to efficiency improvement at the expense of increased complexity. The regenerator 5 is not ideally able to capture all the exhaust heat. This is because the flow of air from the induction-displacer 1 through the regenerator 5 to the combustion-expander 2 occurs at constant volume while the flow of exhaust gas through the regenerator 5 occurs at constant pressure. The heat capacity of air at constant volume is only 70% of the heat capacity at constant pressure so the regenerator 5 will not be fully cooled to ambient temperatures by the gas displaced from the induction-displacer 1 and will therefore be ideally able to accept only 70% of the exhaust heat.

According to a second preferred embodiment of the present invention a non-compression internal combustion engine with heat regeneration and an additional atmospheric stroke is disclosed.

With reference to FIG. 6 the engine comprises at least one set of three variable volume mechanisms, one of smaller working volume than the other two which are of substantially equal size. The smaller variable volume mechanism is the induction-displacer 1. The first larger variable volume mechanism is the combustion-expander 2 and the second larger variable volume mechanism is the atmospheric-cooler 3. The three variable volume mechanisms are in controllable communication with each other via a valve-system 4 which incorporates the regenerator 5 and which has a minimum internal volume. The induction-displacer 1 is in communication with the atmosphere via an induction valve 6 which may be controlled or self-acting.

The atmospheric-cooler 3 is in communication with the atmosphere via an exhaust valve 7 which may be controlled or self-acting.

Figure 7:
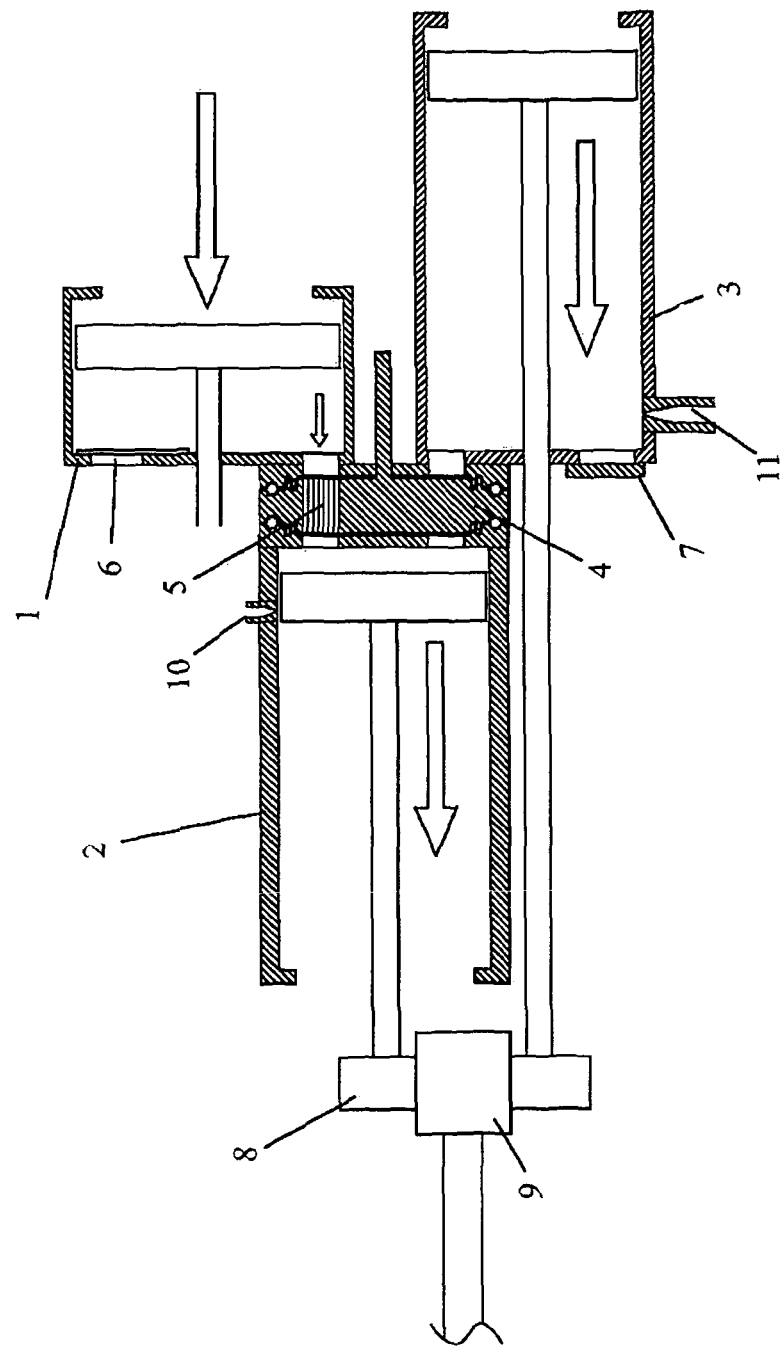
FIG. 7 illustrates the displacement phase of operation of the second embodiment of the present invention.
Figure 8:
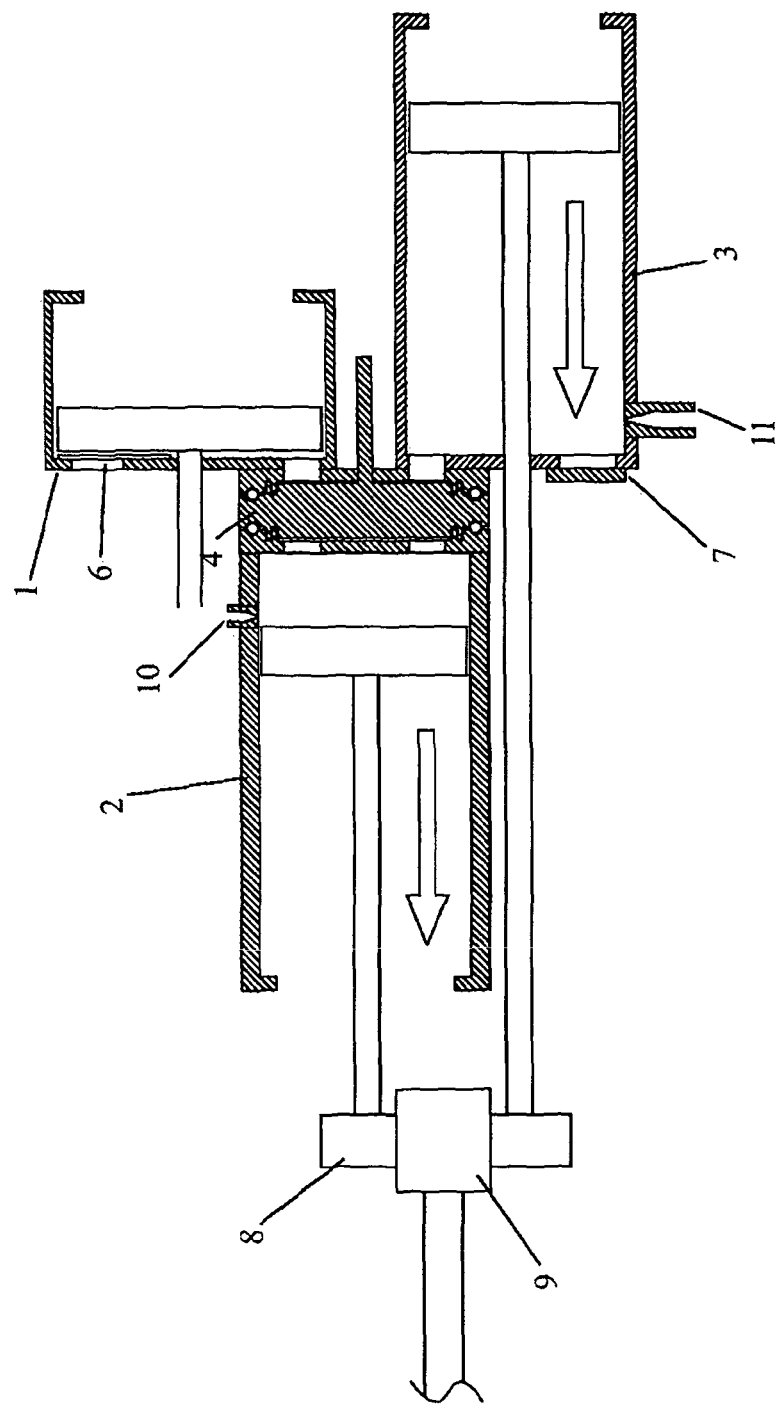
FIG. 8 illustrates the combustion phase of operation of the second embodiment of the present invention.
Figure 9:
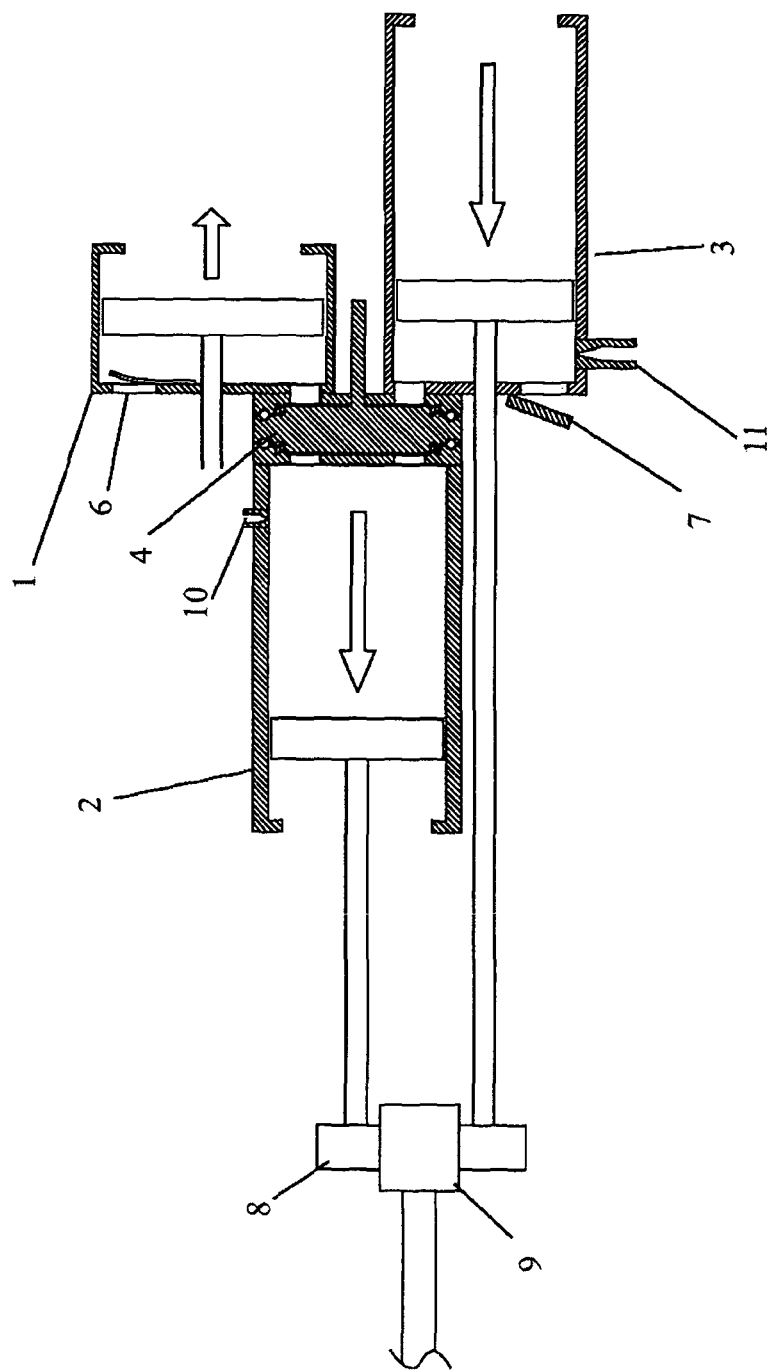
FIG. 9 illustrates the expansion and exhaust phase of operation of the second embodiment of the present invention.
Figure 10:
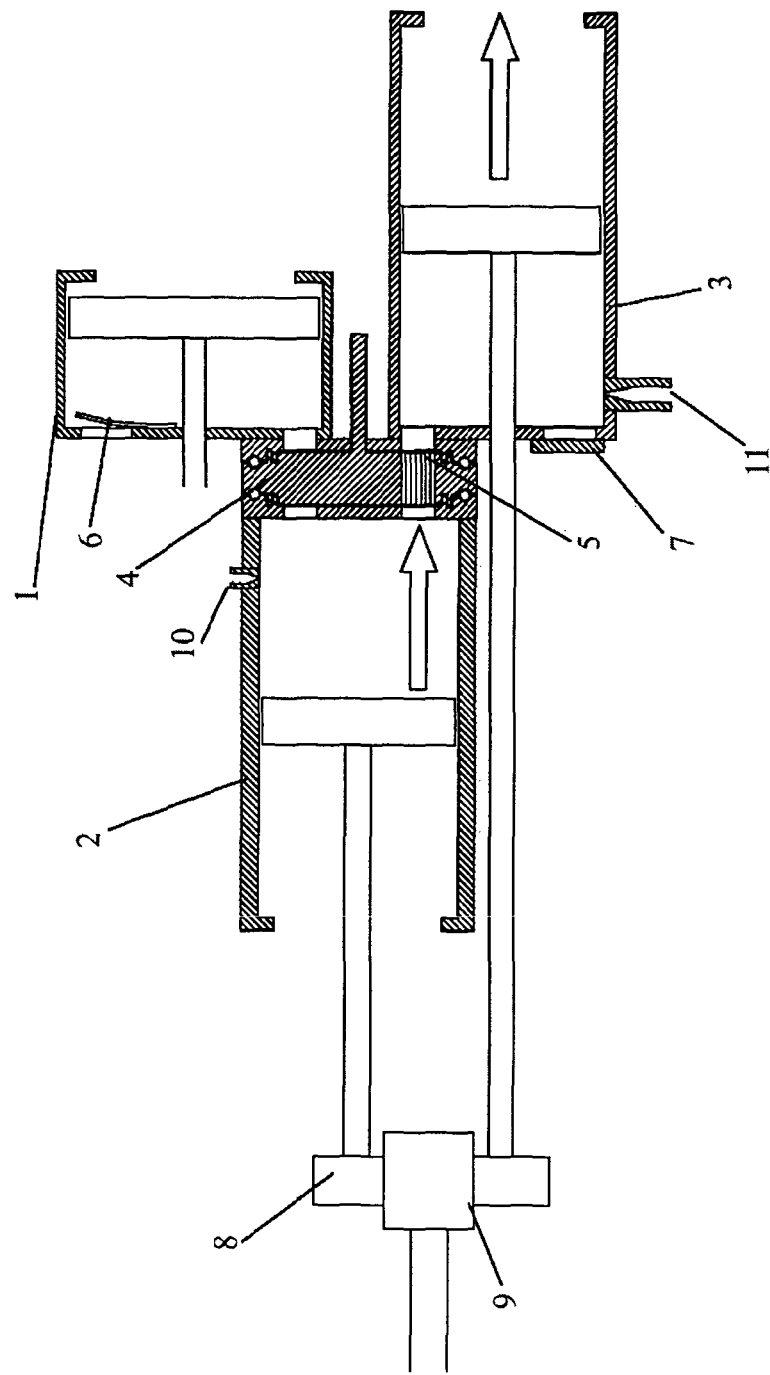
FIG. 10 illustrates the atmospheric cooling phase of operation of the second embodiment of the present invention.

With reference to FIGS. 9 and 10 in operation air is drawn into the induction-displacer 1 from the atmosphere and confined by the induction valve 6. With reference to FIG. 7, the valve-system 4 then puts the induction-displacer 1 in communication with the combustion-expander 2 via the regenerator 5 which is in its hot state. The air is then displaced through the regenerator 5 and becomes hot while the regenerator 5 becomes cool. This displacement is at substantially constant volume because the volume in the combustion-expander 2 increases at the same rate as the reduction in volume of the induction-displacer 1. With reference to FIG. 8 the valve-system 4 then closes confining the gas within the combustion-expander 2. A fuel which may be a liquid, gas or powdered solid is injected via at least one injection nozzle 10 into the hot gas heating it further. This occurs either during the displacement which has the advantage that the combustion is at constant volume but the disadvantage that induction-displacer 1 is subjected to the combustion pressure. Alternatively the combustion may occur after the valve has closed which will mean that the induction displacer 1 is not subjected to the combustion pressure but the combustion will not be at constant volume. In FIG. 9, the combustion-expander 2 then expands the gas through a ratio of between two and twenty times. Work is transferred during this expansion to the connecting rod 9. With reference to FIG. 10 at the end of the expansion stroke the valve-system 4 puts the combustion-expander 2 into communication with the atmospheric-cooler 3 via the regenerator 5 which is in its cool state. The combustion gas is displaced, this time at constant volume into the atmospheric-cooler 3 giving up its heat to the regenerator 5. The original volume of gas is now substantially at ambient temperature again but in a much larger volume with the result that the pressure will now be a partial vacuum. With reference to FIGS. 8 and 9 the valve-system 4 then closes and the atmospheric stroke takes place as the atmospheric-cooler 3 volume contracts driven by the pressure of the atmosphere transferring further work, until the internal and external pressures are equalized. For maximum efficiency a water spray 11 may optionally be used to cool the contraction and render it near isothermal. This may increase engine efficiency by about 7%. Once the pressure has equalised with the atmosphere the exhaust valve 7 opens and releases the gas and water. The water may be separated from the gas, cooled in a heat exchanger and recycled.

Figure 11:
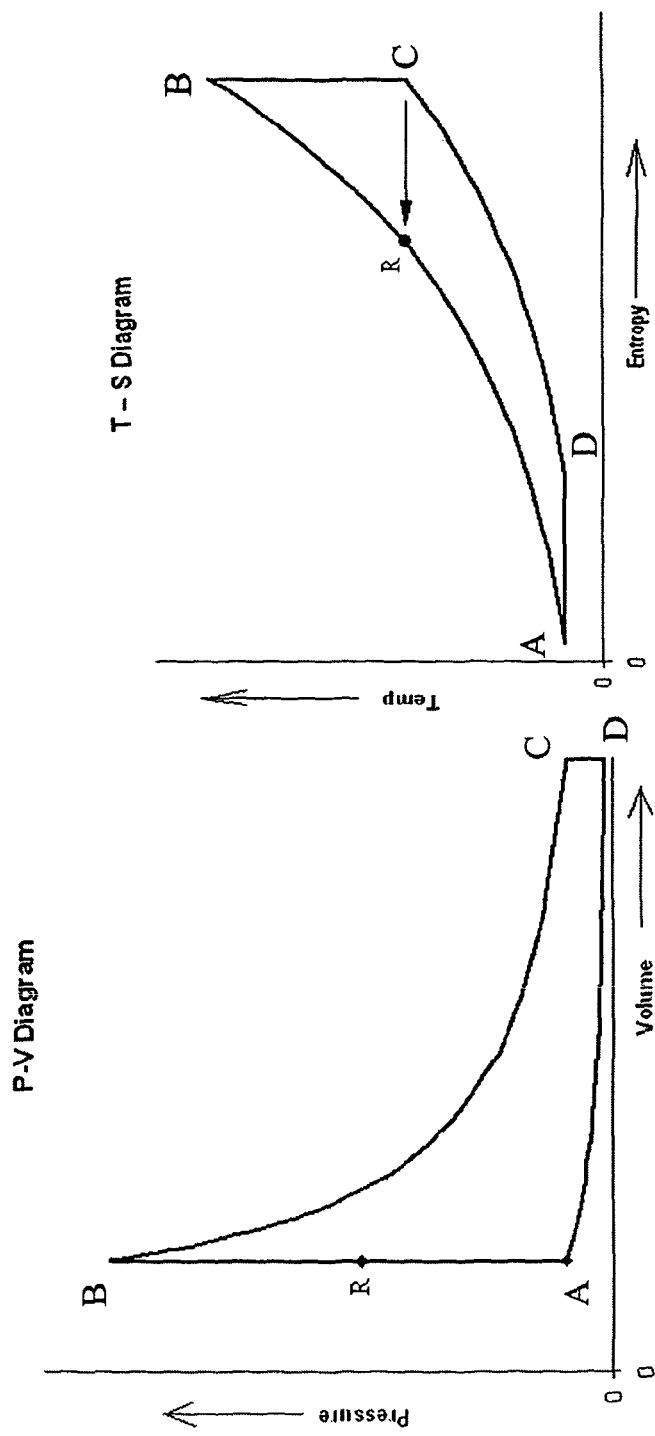
FIG. 11 illustrates graphically the thermodynamic cycle of the second embodiment of the present invention showing the pressure versus volume and temperature versus entropy diagrams.

This has the advantage that the cycle accepts heat at the adiabatic combustion temperature of the fuel and rejects heat at near ambient temperature, having regenerated substantially all the exhaust heat. With reference to FIG. 11 the pressure versus volume and temperature versus entropy diagrams that characterise the cycle of the improved version of the present invention, are shown. Those skilled in the art will observe that these are quite different from known cycles such as the Otto cycle, the Diesel cycle and the Joule-Brayton cycle or the Stirling or Ericsson cycle. On the diagrams the plot from position A to B represents constant volume heating with A to R being regenerative heating while R to B is heating by combustion. The plot from B to C represents adiabatic expansion. The plot from C to D represents heat rejection to the regenerator 5. The plot D to A represents isothermal contraction back to atmospheric pressure. The Temperature Entropy diagram shows that the temperature limits of the heat rejected in phase C to D is entirely encompassed by the heating phase A to B. It will thus be possible to provide heat from A to R by regeneration of the heat rejected in C to D and heat from the combustion of fuel is only required from R to B. This cycle does not achieve efficiency equal to the Carnot limit because the constant volume combustion process is not reversible. However the transient temperature rise which can go above the limits which the materials could withstand on a continuous basis means that the Carnot limit is higher so the overall efficiency is greater.

Cooling losses are minimised by the same means as described in the first embodiment of the present invention because the combustion-expander 2 is able to operate at a very high temperature. Many arrangements of components are possible within the intent of the present invention. The arrangement shown has the advantage of separating the hot and the cool confinements to minimise heat transfer between them. Preferably other measures should be taken to minimise heat loss from the combustion-expander 2 including heat insulating measures within the valve-system 4 and regenerator 5 and shields to reflect and contain the radiating heat.

An alternative embodiment is shown in FIG. 12. In this version the induction-displacer 1, combustion-expander 2 and atmospheric-cooler 3 are all driven from the same direction. The combustion-expander and atmospheric-cooler are connected to a conventional crankshaft 24 such that they are driven 180 degrees out of phase. The induction-displacer 1 has a much shorter stroke and the discontinuous motion is controlled by a face cam 22 engaged with cam-follower 23. The flow of gas between the cylinders is controlled by a set of valves 4 which operate in the displacement mode such that they eliminate dead volume when they are closed. These are controlled by the camshaft 21 which is driven by a timing belt or chain 25 from a sprocket 26 attached to the crankshaft. In this embodiment the inlet valve 6 and exhaust valve 7 are also cam operated.

A further advantage is that the exhaust leaves the engine substantially at atmospheric pressure and temperature and will therefore be inherently quiet without the need for a large silencer. If the water spray option is used, as well as improving the efficiency of the engine it will remove soluble gasses from the exhaust including water and oxides of nitrogen or sulphur which is present in some fuels. The generation of oxides of nitrogen can also be controlled by controllably mixing a proportion exhaust gas with the intake air to ensure that the combustion process has little or no excess oxygen.

Most of the principles which form the basis of the present invention herein have been known to the art for over a century. However the combination and order disclosed is novel and effectively addressed the two major energy conversion loss modes of engines of the current technology and offers a number of additional benefits. It therefore offers substantial and hitherto unrealised advantages.

Various modifications may be made to the embodiments shown without departing from the scope of the invention as defined by the accompanying claims as interpreted under Patent Law.

The invention claimed is:

1. A non-compression internal combustion engine arranged to operate in a cycle and including:
   an energy regenerator to facilitate the regeneration of heat;
   the engine having a combustion expander comprising a first variable volume mechanism including an internal volume and a movable member that varies the internal volume upon movement of the movable member arranged to operate in the cycle and the energy regenerator being arranged to return a proportion of heat energy in the gas leaving the combustion expander back to the combustion expander;
   wherein the engine includes an induction-displacer comprising a second variable volume mechanism including an internal volume and a moveable member that varies the internal volume upon movement of the movable member in communication with the atmosphere via an induction valve for drawing a working volume of gas into the engine; and
   wherein the engine includes a valve system for controlling the flow of the working gas to or from the energy regenerator; wherein
   the valve system is arranged to control communication between the combustion-expander the induction-displacer and the energy regenerator; and
   wherein the valve system is arranged for putting the induction displacer in communication with the combustion expander via the energy regenerator.

2. A non-compression engine as claimed in claim 1, in which the energy regenerator is arranged to supply heat to the working volume of gas at substantially constant volume.

3. A non-compression engine according to claim 1, wherein the energy regenerator is arranged to take energy from working gas in the cycle of the first variable volume mechanism and to return it as heat in a later cycle of the first variable volume mechanism.

4. A non-compression engine as claimed in claim 1, which includes a fuel inlet located for the introduction of fuel into the combustion-expander for combustion therein.

5. A non-compression engine according to claim 1, wherein the combustion-expander comprises a piston and cylinder.

6. A non-compression engine according to claim 1, wherein the combustion-expander has a labyrinth seal or an air bearing means between moving parts thereof.

7. A non-compression engine according to claim 1, wherein the combustion-expander comprises a combustion chamber connected through a nozzle to a turbine wheel.

8. A non-compression engine according to claim 1, wherein the combustion-expander is constructed from a heat-resistant material selected from a group including stainless steel, high temperature alloys and engineering ceramics.

9. A non-compression engine according to claim 1, wherein the valve-system includes a movable member having the energy regenerator located thereon.

10. A non-compression engine according to claim 9, wherein the movable member comprises a rotatable disk arranged to provide rotational movement of the energy regenerator between a first position in which it provides energy to working gas entering the combustion-expander and a second position in which it takes heat from working gas leaving the combustion-expander.

11. A non-compression engine according to claim 1, wherein the induction-displacer has an induction valve.

12. A non-compression engine according to claim 11, wherein the induction-displacer comprises a piston and cylinder.

13. A non-compression engine according to claim 1, wherein the induction-displacer has an induction valve and wherein the induction-displacer comprises a piston and cylinder in which the valve system is arranged to control communication between the combustion-expander, the induction-displacer and the energy regenerator.

14. A non-compression engine according to claim 1, including an atmospheric stroke to receive gas from the combustion expander, the atmospheric stroke comprising a third variable volume mechanism including an internal volume and a movable member that varies the internal volume upon movement of the movable member.

15. A non-compression engine according to claim 14, wherein the atmospheric stroke includes an atmospheric cooler.

16. A non-compression engine according to claim 15, wherein the atmospheric cooler comprises a piston and cylinder.

17. A non-compression engine as claimed in claim 15, wherein the atmospheric cooler includes a spray system for spraying liquid into the gas to remove heat.

18. A non-compression engine according to claim 15, in which the atmospheric cooler has an exhaust valve communicating with atmosphere.

19. A non-compression engine according to claim 18, including a crankshaft configured to drive the induction-displacer, the combustion-expander and the atmospheric cooler.

20. A non-compression engine according to claim 19, wherein the combustion-expander and the atmospheric cooler are driven 180 degrees out of phase with each other.

21. A non-compression engine according to claim 20, wherein the induction-displacer has a shorter stroke than the combustion-expander and the atmospheric cooler.

22. A non-compression engine according to claim 21, including a face cam and a cam follower driveable by the crankshaft to control the induction-displacer.

23. A non-compression engine according to claim 22, including valves operable in a displacement mode by a camshaft to eliminate dead volume when closed.

24. A non-compression engine according to claim 1, wherein the energy regenerator includes a regenerator element arranged to accumulate, store and give out energy, the regenerator element incorporating a flow path for allowing working gases to flow therethrough.

* * * * *